(12) United States Patent
Hioe et al.

(10) Patent No.: US 6,341,145 B1
(45) Date of Patent: Jan. 22, 2002

(54) COMMUNICATION METHOD FOR BROADBAND DIGITAL RADIO SYSTEM AND BROADBAND DIGITAL RADIO COMMUNICATION TERMINAL

(75) Inventors: Willy Hioe, Kokubunji; Toshikazu Nishino, Kawasaki, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/041,771

(22) Filed: Mar. 13, 1998

(30) Foreign Application Priority Data

Mar. 13, 1997 (JP) ............................................. 9-058792

(51) Int. Cl.[7] ............................................. H04L 27/00
(52) U.S. Cl. ...................... 375/256; 375/231; 375/354; 455/343; 455/517
(58) Field of Search ................................ 375/256, 231, 375/260, 354, 296; 455/343, 517, 522, 436; 371/32

(56) References Cited

U.S. PATENT DOCUMENTS

| | | | | |
|---|---|---|---|---|
| 4,531,237 A | * | 7/1985 | Bar-on et al. ................ | 455/343 |
| 5,285,474 A | * | 2/1994 | Chow et al. ................. | 375/231 |
| 5,625,651 A | * | 4/1997 | Cioffi .......................... | 375/354 |
| 5,835,508 A | * | 11/1998 | Kushita ........................ | 371/32 |
| 5,839,077 A | * | 11/1998 | Kowaguchi .................. | 455/517 |

* cited by examiner

Primary Examiner—Stephen Chin
Assistant Examiner—Shuwang Liu
(74) Attorney, Agent, or Firm—Antonelli, Terry, Stout & Kraus, LLP

(57) ABSTRACT

A broadband radio communication system and method therefore that conducts communication on a plurality of narrowband channels obtained by dividing a broadband channel into a plurality of narrowband channels. The invention provides a first radio communication terminal which sets transmission conditions of at least part of the narrowband channels and transmits a wireless packet on the narrowband channels of which the transmission conditions have been set, and a second radio communication terminal which receives the wireless packet from the first radio communication terminal, measures the line qualities of the narrowband channels and transmits measured line quality information to said first radio communication terminal. The first radio communication terminal receives the line quality information, sets new transmission conditions based on the line quality information, and transmits a wireless packet to the second radio communication terminal through the narrowband channels under the new transmission conditions.

5 Claims, 12 Drawing Sheets

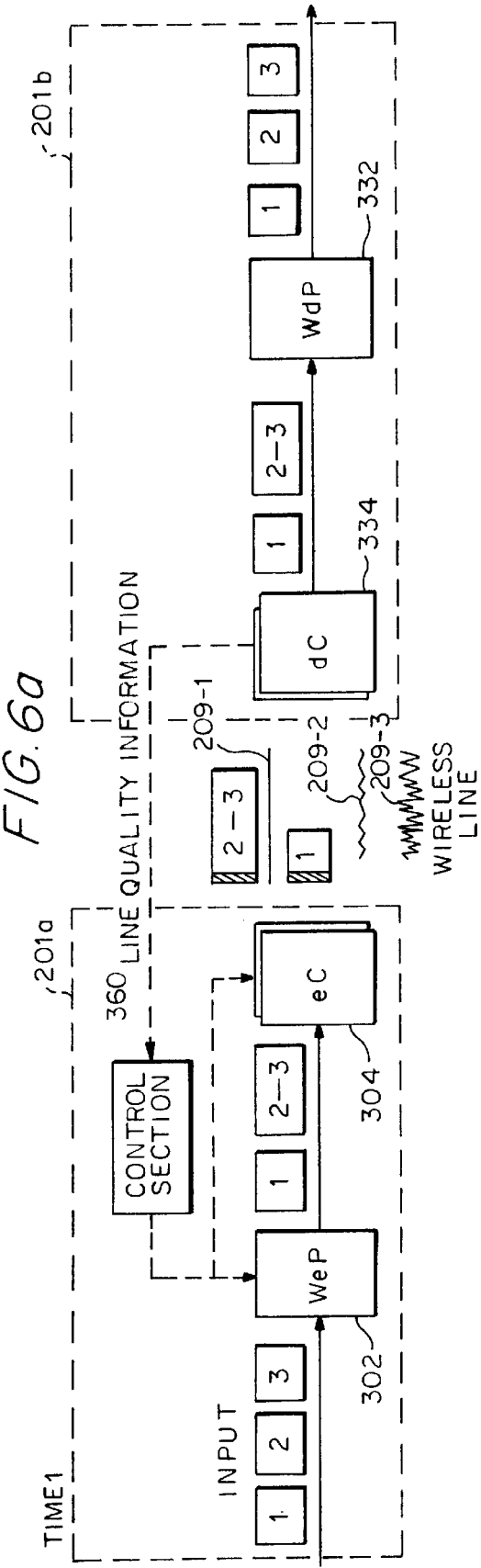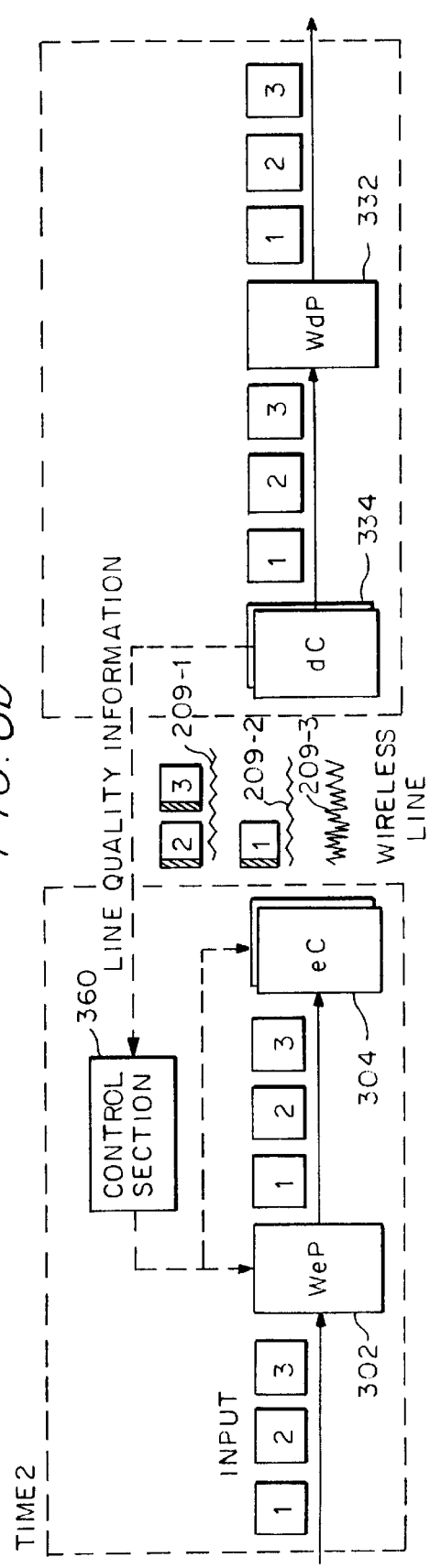

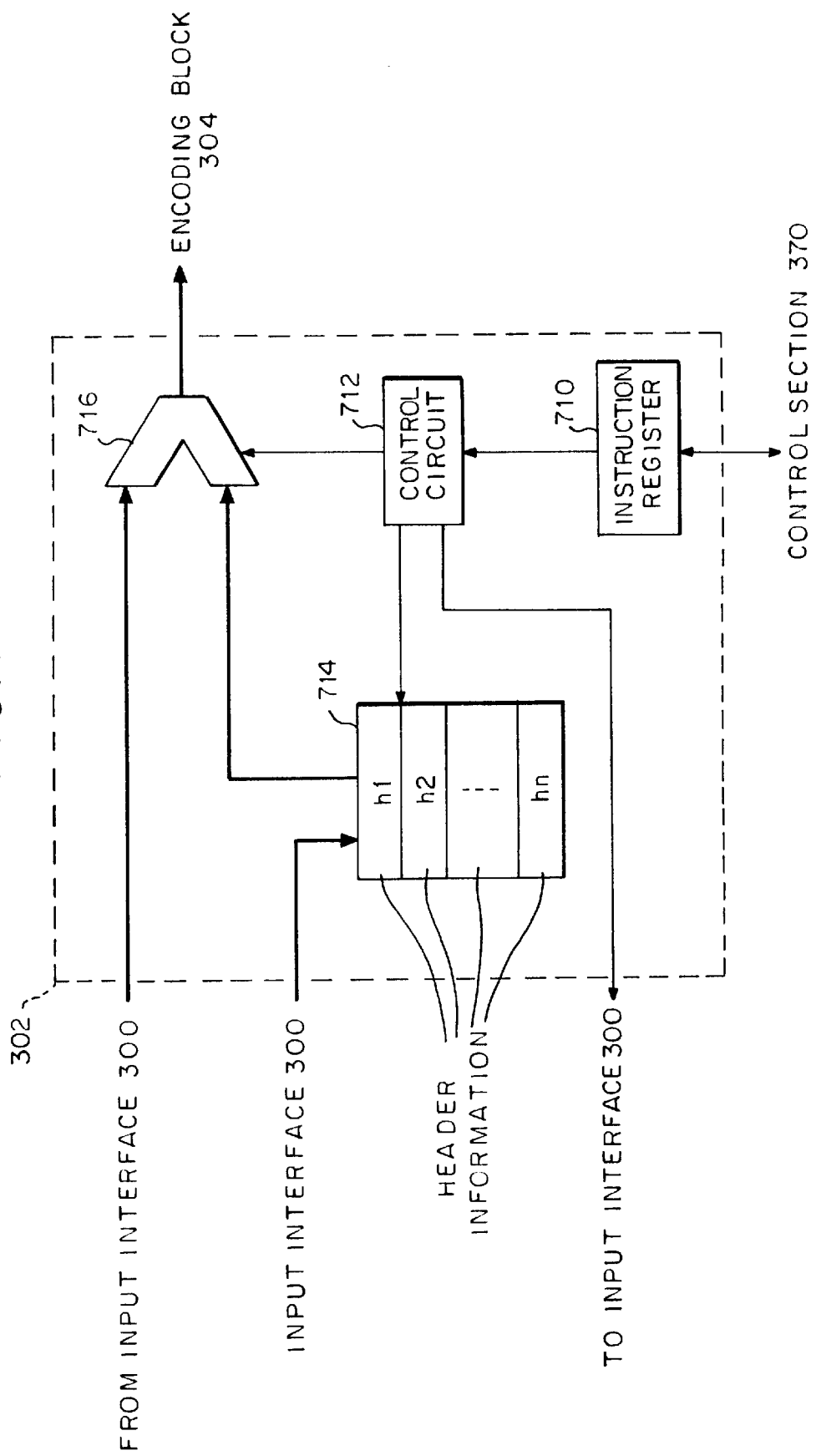

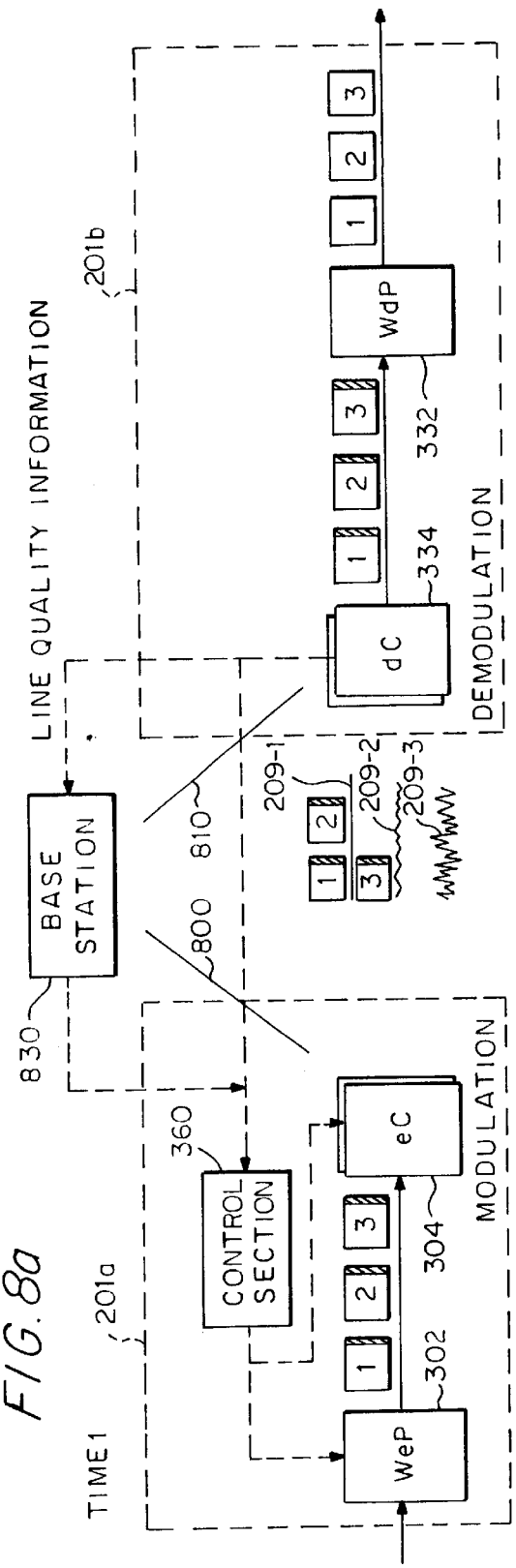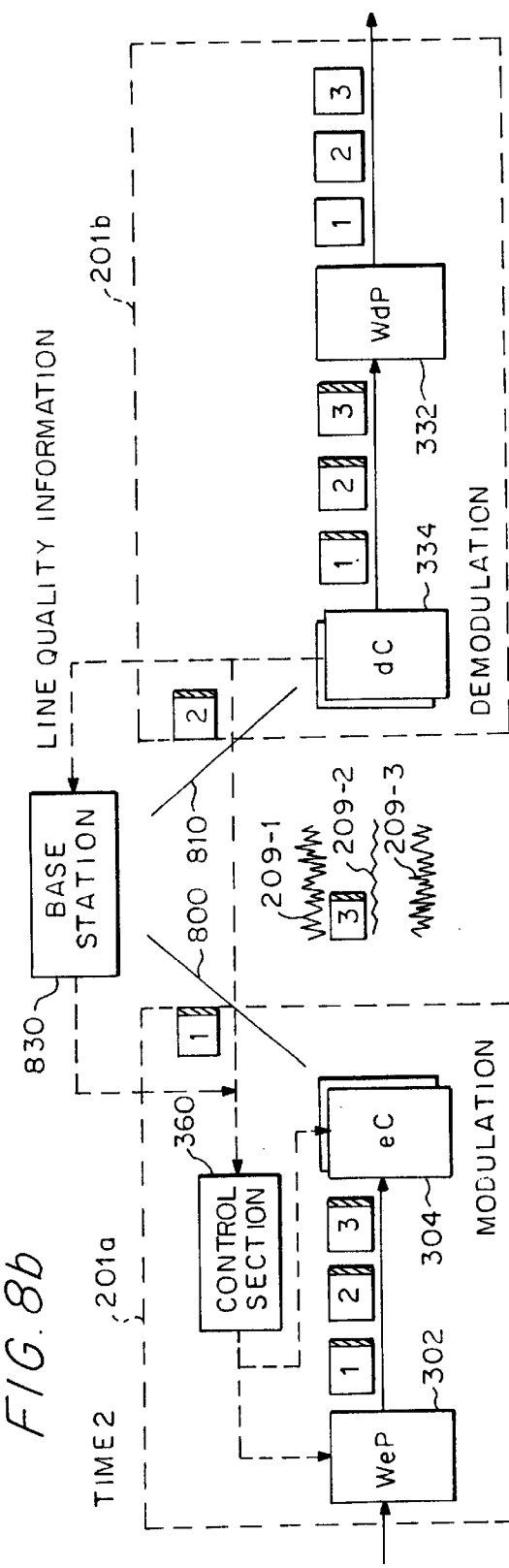

FIRST TRANSCEIVER

SECOND TRANSCEIVER

THIRD TRANSCEIVER

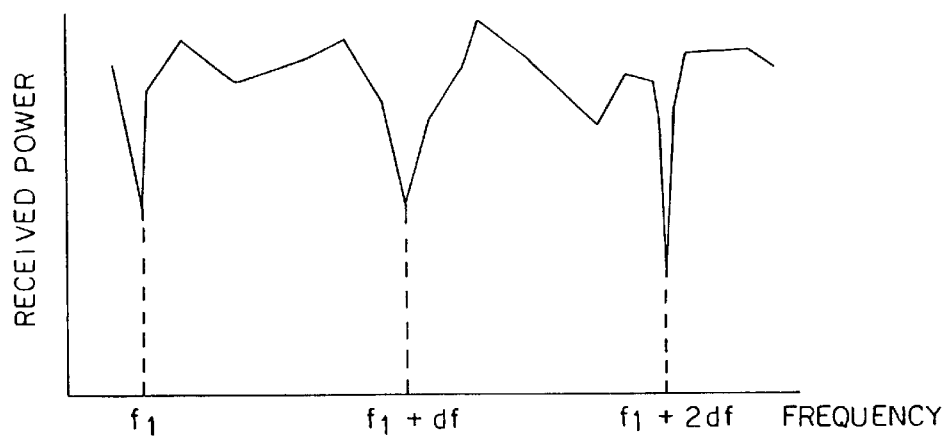
FIG. 13
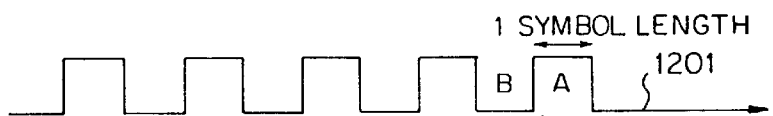
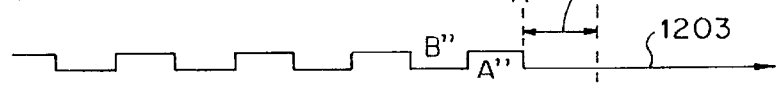
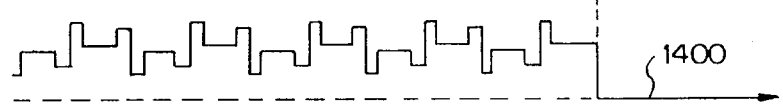
FIG. 14A
FIG. 14B
FIG. 14C
FIG. 14D

COMMUNICATION METHOD FOR BROADBAND DIGITAL RADIO SYSTEM AND BROADBAND DIGITAL RADIO COMMUNICATION TERMINAL

BACKGROUND OF THE INVENTION

The present invention relates to broadband digital radio communication of at least several Mbps. More particularly, the present invention relates to a method and apparatus for setting a transmission condition in a radio communication system which conducts communication between radio communication terminals based on a measure of the line quality of the channels being used.

In a conventional indoor wireless system, it is normal that a transmitted radio signal is substantially reflected and received through a plurality of different paths depending on the condition of the transmission environment (such as the ceiling, floor, or furniture). FIG. 12 is an illustration showing a state of radio wave transmission in a room. Radio waves radiated from a terminal 1210 are received by a terminal 1212 through a plurality of paths. A signal passing through a path 1201 is not reflected but it is directly received (this signal is referred to as "direct signal"). A signal passing through a path 1202 is reflected once and then received and a signal passing through a path 1203 is reflected twice and then received. These signals 1202 and 1203 are each referred to as a "multipath signal". Because received signals passing through different paths are different from each other in phase, interference occurs between carrier waves and a phenomenon called frequency selective fading occurs in which signal power suddenly decreases at a specific frequency, as shown in FIG. 13.

The influence of this phenomenon remarkably differs between the case of millimeter wave transmission (30 to 300 GHz) and the case of quasi-microwave transmission (e.g., 2.4 GHz). When a carrier wave is a millimeter wave, it greatly attenuates compared to the case of a quasi-microwave even when both waves are transmitted over the same distance. Therefore, in the case of a quasi-microwave, even a multipath signal repeatedly reflected in a space many times keeps a high-enough intensity and causes interference. As a result, distance differences between paths causing interference are widely distributed. In the case of a millimeter wave, however, distance differences between paths causing interference are concentrated on a limited range. As a result, frequency selective fading occurs in the whole frequency band used in the case of a quasi-microwave. In the case of a millimeter wave, however, the phenomenon strongly occurs in part of the frequency band used, as shown in FIG. 13.

Moreover, in the case of broadband communication, the object of the invention, requiring a symbol transmission rate of several mega-symbols/sec or more, the problem of inter-symbol interference (ISI) occurs. This is because a signal is transmitted at a high speed and thereby, delay of a multipath signal cannot be ignored. As shown in FIGS. 14A–14D, the delay time of a multipath signal accounts for a large part of the time corresponding to one symbol in the case of high-speed transmission, and a delay equivalent to most part of the length of one symbol (in the case of the multipath signal 1202) or more (in the case of the multipath signal 1203) occurs. Thereby, symbols A' and A" of multipath signals corresponding to symbol A of the direct signal 1201 strongly interfere with symbol B which is the next symbol of the direct signal.

Thus, in the case of high-speed transmission, strong ISI occurs between multipath signals and the direct signal. Attenuation of the multipath signals is small because the path lengths are not very large compared to the case of the direct signal. Therefore, it is impossible to decode a reception signal 1400 on which the above multipath signals are superimposed.

A conventional apparatus for solving the ISI problem due to high-speed transmission is disclosed in the proceedings of Symposium on Development of Frequency Resources 96, pp. 25–35. To moderate the ISI problem producing ghost signals, the conventional apparatus divides a high frequency band into a plurality of narrow frequency bands and limits the symbol transmission rate of each narrow frequency band so that the ISI does not become a problem in each narrow frequency band.

The transmission method of constructing a broadband channel from a plurality of narrow frequency bands is generally known as frequency division multiplex (FDM) method.

In an indoor environment, the line quality changes in a short time because the radio wave transmission environment frequently changes compared to the case of an outdoor environment. Therefore, the line quality becomes very unstable and thus, there is a problem that the error rate may suddenly increase or the line may be cut off even if the FDM method is directly applied.

When high-speed transmission (10 Mbps or more) is used, it is expected that a multimedia radio terminal capable of transmitting data or video in addition to voice, by a presently used wireless terminal (much less than 10 Mbps), can be realized. For this reason, it is necessary to transmit signals having various communication characteristics at the same time. For example, the communication characteristics of voice allows for the error rate to be a little high but the variation in transmission delay cannot be large. On the other hand, the communication characteristics of ordinary data allows for a variation in transmission delay but communication errors can be a problem.

In the conventional apparatus, it has been impossible to provide a line quality corresponding to the quality of service required for information to be transmitted and communications to be performed. Therefore, when the conventional apparatus is applied to multimedia communication a problem arises that communication efficiency is reduced because communication is performed at a line quality higher than required.

Further, while the demand for a multimedia terminal using high-speed communication and a wide frequency band exists, a demand that communication of only voice or data or multimedia communication using a lower quality of service also exists. For an indoor radio LAN, it would be convenient if a high-performance multimedia terminal using a wide frequency band can communicate, in the same system, with a portable terminal of low cost, low power consumption and uses a narrow frequency band.

SUMMARY OF THE INVENTION

An object of the present invention is to provide a method and apparatus for setting a transmission condition in a radio communication system which conducts communication between radio terminals based on a measure of the line quality of the channels being used.

The present invention provides a communication method and system of which sets a transmission condition in a broadband radio communication system. The broadband radio communication system conducts communication between first and second radio communication terminals on a plurality of narrowband channels obtained by dividing a broadband channel. The broadband radio-communication system can be a digital system.

The communication method and system of the present invention performs the steps or the functions of setting a transmission condition of at least part of the narrowband channels in the first radio communication terminal, transmitting a wireless communication from the first radio communication terminal to the second radio communication terminal on the at least part of the narrowband channels for which the transmission condition has been set, measuring in the second radio communication terminal a line quality of each narrowband channel of the at least part of the narrowband channels upon receipt of the wireless communication from the first radio communication terminal, and transmitting line quality information indicating the line quality of each narrowband of the at least part of the narrowband channels from the second radio communication terminal to the first radio communication terminal. The setting or function is performed again using a new transmission condition for each narrowband channel of the at least part of the narrowband channels based on the line quality information received from the second radio communication terminal.

The present invention further provides a radio communication terminal which is usable in a broadband radio communication system conducts communication between a plurality of the radio communication terminals on a plurality of narrowband channels obtained by dividing a broadband channel. The radio communication terminal includes a transmitter which transmits a wireless communication on at least a part of the narrowband channels to another radio communication terminal according to a transmission condition which has been set, a receiver which receives wireless communication on the at least a part of the narrowband channel from the other radio communication terminal according to the set condition and a detector which detects a line quality of each narrowband channel of the at least part of the narrowband channels upon receipt of the wireless communication from the other radio communication terminal.

The radio communication terminal further includes a controller which causes the transmitter to transmit line quality information representative of the line quality of each narrowband channel of the at least part of the narrowband channels detected by the detector to the other radio communication terminal and sets a new transmission condition for each narrowband channel of the at least part of the narrowband channels based on the line quality information received from the other radio communication terminal.

BRIEF DESCRIPTION OF THE DRAWINGS

The present invention will be more apparent from the following detailed description, when taken in conjunction with the accompanying drawings, in which:

FIGS. 6A and 6B are diagrams for explaining wireless-packet-length control in the broadband digital radio system;

FIG. 7 is a block diagram of a wireless packeting block for controlling the wireless-packet length;

FIGS. 8A and 8B are diagrams for explaining aerial line control in the broadband digital radio system;

FIG. 13 is a diagram illustrating the fading effect due to multipath signals in indoor radio-wave transmission; and FIGS. 14A–14D are diagrams illustrating an effect of interference between codes due to multipath signals in indoor radio-wave transmission.

DETAILED DESCRIPTION OF THE PREFERRED EMBODIMENTS

Figure 1A:
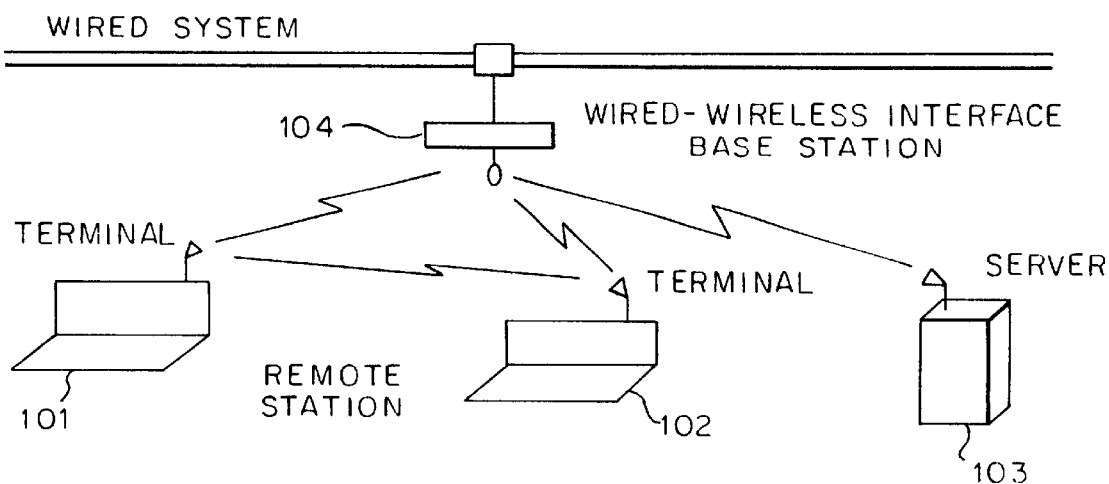
FIGS. 1A–1C are diagrams illustrating a broadband digital radio system and time slots of time division multiplex access (TDMA)

FIG. 1A shows a radio Local Area Network (LAN) system to which the present invention is applied. The radio LAN system includes radio communication terminals 101 and 102, a server 103, and a wired-wireless interface 104. Each of the elements of the radio LAN use one common frequency band. Of course, the number of terminals used is not restricted to 4. Communication is performed by multiplexing the frequency band used to effect simultaneous communication between a plurality of terminals by using one frequency band. To control the multiple access, the system is constructed such that, for example, a wired-wireless interface 104 serves as a base station and other terminals serve as remote stations. The base station controls the accesses by the multiple access method used by the radio LAN system and the remote stations perform communication in accordance with the instructions of the base station.

Figure 1B:
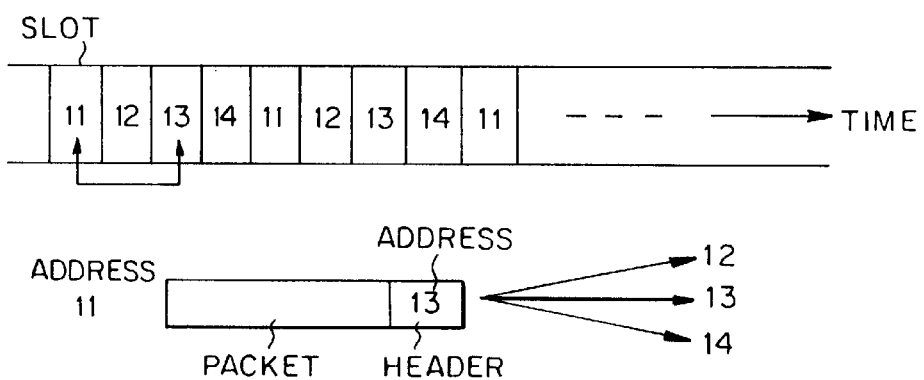

Various methods are already proposed as a multiple access method for radio communication. Here, a case in which a time division multiple access (TDMA) method is used will be described below. The TDMA method is a method in which one broadband channel is divided into transmission time slots, one user (e.g. terminal) is assigned to one of the transmission time slots, and each user transmits data only during the transmission time slot assigned to the user. The transmission side packs the data to be transmitted in wireless packets and adds the address of the reception side to the header portion of each packet. The reception side reads the addresses of packets and processes only the packets addressed to the reception side FIG. 1B.

Figure 1C:
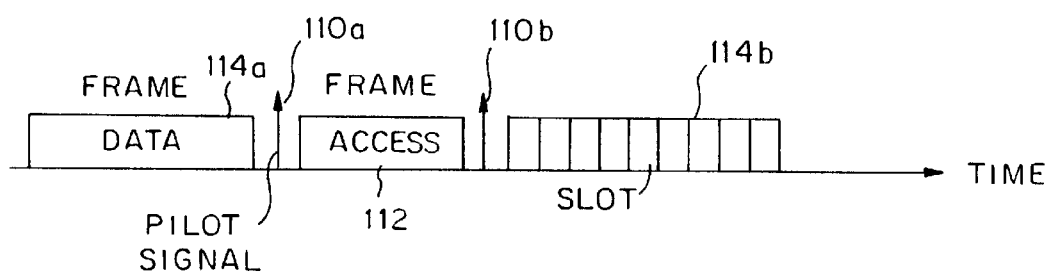

In the case of the TDMA method, a line use time is divided into frames as shown in FIG. 1C. A synchronization signal 110 for synchronizing each remote station with a frame is sent during the time between frames in addition to a blank time. Frames are sorted into two types, namely, an access frame 112 for performing communication to control the use of a transmission time slot, and a signal frame 114 for performing actual communication. These frames of two types are each further divided into time slots.

A remote station to which no transmission time slot is assigned first requests by using the access frame that the base station assign a transmission time slot to the remote station. The base station assigns an idle transmission time slot of the signal frame to the remote station. When transmission is completed, the remote station outputs a completion signal to the base station and the assignment of the transmission time slot is canceled.

Figure 2:
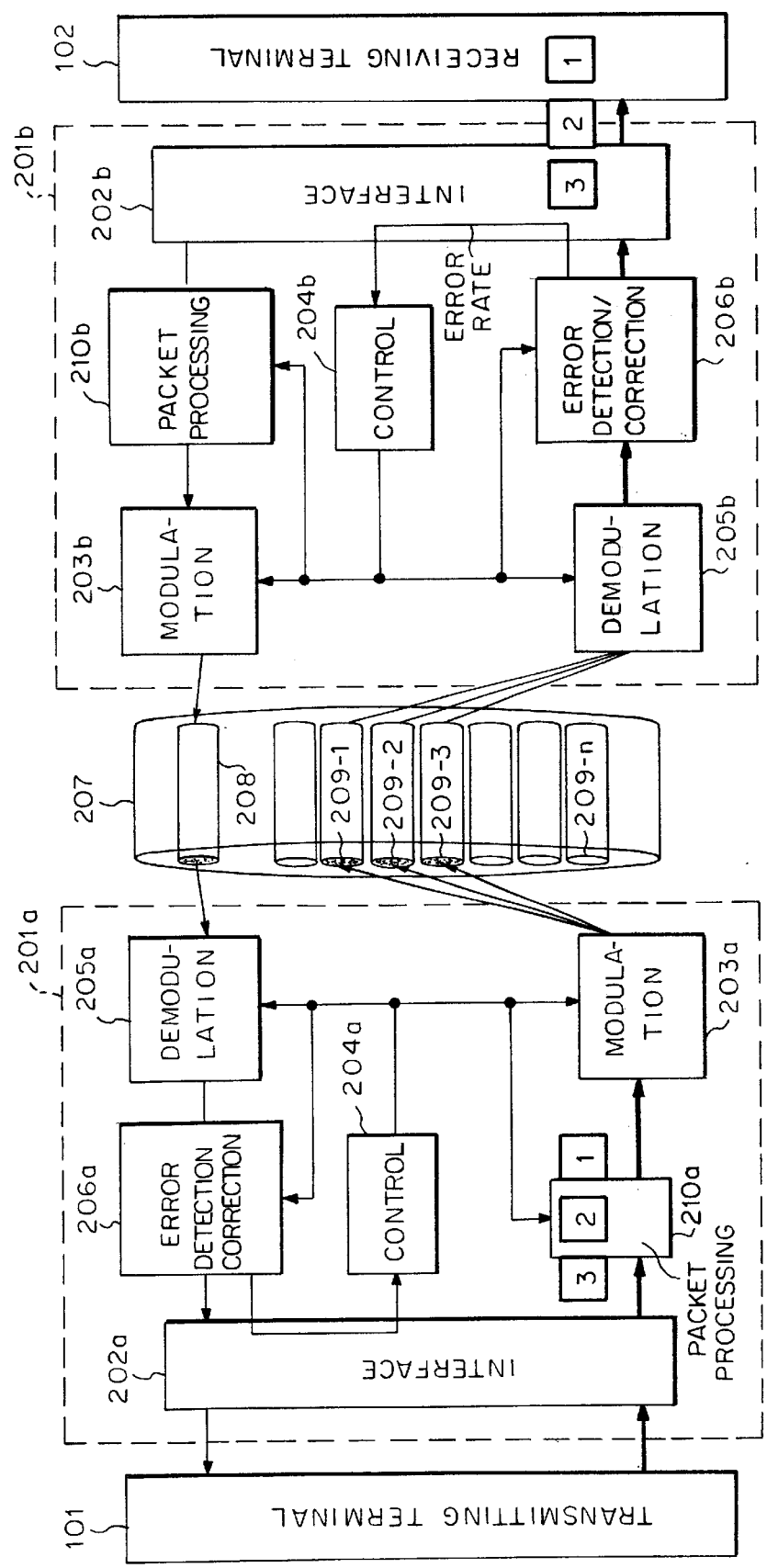
FIG. 2 is a diagram illustrating a principle of a broadband digital radio system.

FIG. 2 shows the structure of a broadband radio system of the present invention using functional blocks. The broadband radio system can be a digital system. The theory of the present invention will be described below, referring to FIG. 2. In FIG. 2, there is shown a state that a terminal (transmission side) 101 communicates with a terminal (reception side) 102. Numeral 201 denotes a radio module for performing transmission and reception by radio. For easy understanding, functional blocks for transmission are mainly shown in a transmission-side radio module 201a and functional blocks for reception are mainly shown in a reception-side radio module 201b. Each terminal 101 and 102 includes both transmission-side and reception-side radio modules. The terminal 101 and the terminal 102 perform transmission and reception respectively through a broadband channel 207 by using a transmission time slot assigned by the base station 104. According to the case of the present invention, the broadband channel 207 is divided into narrowband channels (208 and 209). The narrowband channels comprise a control narrowband channel (hereafter referred to as "control channel") 208 and transmission narrowband channels (hereafter referred to as "transmission channels") 209-1 to 209-n.

The data to be transmitted to the reception-side terminal 102 from the transmission-side terminal 101 is temporarily stored in an interface section 202a of the radio module 201a. The stored data undergoes packet processing in a packet processing section 210a, a predetermined modulation in a modulation section 203a and is transmitted to the terminal 102 through transmission channels (transmission channels 209-1, 209-2, and 209-3 in the case of FIG. 2) set up by a control section 204a. It is possible to determine a transmission channel to be used first as a default channel. A test signal is periodically transmitted to a transmission channel not used for data transmission to supervise line quality.

A signal received by the radio module 201b is demodulated by a demodulation section 205b and undergoes error correction in an error detection/correction section 206b. The reception data undergone error correction is stored in the interface section 202b and output to the terminal 102. The error rates of the transmission channels (209-1, 209-2, and 209-3) and the error rates of the other transmission channels detected by a test signal are transmitted to the terminal 101 via the control channel 208 as part of the control information.

The radio module 201a judges the error rate information (line quality) of the transmission channels received by the control section 204a and the quality of service required to transmit data (hereafter referred to as "required quality of service") at the same time and determines transmission conditions and transmission channels. As described above, the line quality of each narrowband channel is returned whenever a data signal is transmitted to perform optimum communication while meeting the required quality of service of the data.

Thus, a feedback loop for cyclically supervising the line quality is formed by transmitting data and a test signal and returning error rate information of the transmitted data. The feedback loop will be referred to as supervision cycle. A broadband communication system of the present invention changes transmission conditions (data rate, error control method, and size of wireless packet) in accordance with the change of line qualities or the required quality of service. To correctly decode a signal, a reception-side terminal must change the set conditions of the demodulation circuit correspondingly to these transmission conditions.

The transmission conditions of each transmission channel are sent to the communication party through a control channel as part of the control information. To change transmission conditions, the change time is also transmitted to the communication party. To confirm whether the transmission conditions are correctly changed, the reception-side radio module 201b transmits a confirmation signal to the transmission-side radio module 201a. After receiving the confirmation signal of the transmission conditions, the transmission-side terminal and the reception-side terminal execute the control for changing transmission/reception conditions at a designated change time.

Moreover, it is possible to set up a configuration in which the reception-side terminal does not transmit a confirmation signal. In this case, it is necessary that the system previously determines a certain delay time. The transmission-side terminal and reception-side terminal changes the transmission conditions after the delay time passes from the time at which a packet is transmitted. It is necessary that the delay time is sufficiently longer than the time required to change the transmission conditions.

Figure 3:
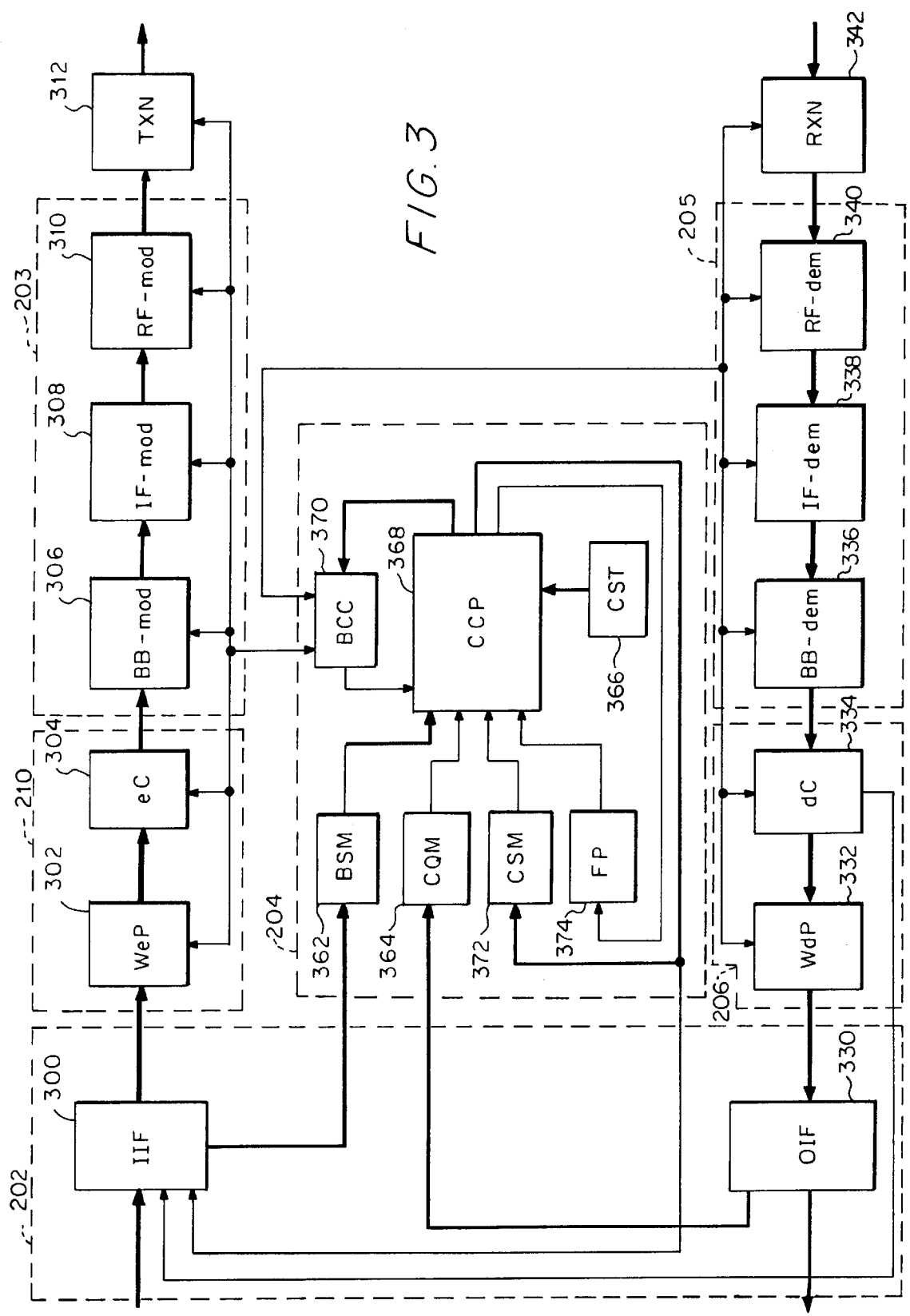
FIG. 3, is a block diagram of a radio communication terminal of the broadband digital radio system.

FIG. 3 shows the structure of the radio module 201. The structure of the radio module 201 will be described below referring to FIG. 3. The radio module 201 includes transmission units 300 through 312, reception units 330 through 342, and a control section 360. More specifically, elements 300 and 330 correspond to the interface section 202, elements 306, 308 and 310 correspond to the modulation section 203, element 360 corresponds to the control section 204, elements 336, 338 and 340 correspond to the demodulation section 205, elements 332 and 334 correspond to the error detection/correction section 206 and elements 302 and 304 correspond to the packet processing section 210. The functions of the transmission and reception units and control section will be described below relative to the individual elements illustrated in FIG. 3.

The transmission unit will be described as follows.

Data is input to the input interface (IIF) 300 from a terminal as a digital signal. The input data is classified in accordance with the transmission conditions. Specifically, the classification or category of the transmission conditions is determined by some of the required qualities of services in the system. These qualities may be the upper limit of the transmission delay, the lower limit of the transmission rate, and the upper limit of the error rate. A category is written as, for example, the header information of a data packet input to the input interface 300 from a terminal. In the input interface 300, data are arranged in order of arrival for each category, referring to the header information, and temporarily held. The data from the input interface 300 is transmitted to a wireless-packeting block (WeP) 302 from the input interface 300 at a predetermined timing and incorporated into a packet for radio transmission. Coding for radio transmission, error control coding, and encryption if necessary are applied to the packeted data by an encoding block (eC) 304. Then, a digital signal is converted into an analog signal by a baseband modulation block (BB-mod) 306 and an analog waveform is generated. The generated analog signal is modulated into an intermediate frequency band by an intermediate frequency modulation block (IF-mod) 308 and at the same time, the frequency components other than the occupied narrow frequency band are suppressed. An intermediate frequency signal is upconverted to a radio frequency by a radio frequency modulation block (RF-mod) 310 where the signal power is amplified up to the transmission level and the frequency components other than the occupied wide frequency band are suppressed. The amplified signal is radiated from a transmission antenna (TXN) 312.

The reception unit will be described as follows.

The frequency of the reception signal received by a reception antenna (RXN) 342 is lowered from the radio frequency to an intermediate frequency by a radio frequency demodulation block (RF-dem) 340, lowered to a frequency near the baseband frequency band by an intermediate frequency demodulation block (IF-dem) 338, and demodulated to a digital signal by a baseband demodulation block (BB-dem) 336. The demodulated digital signal is decrypted by a decoding block (dC) 334 when the received signal is encrypted, and error correction and encoding are applied to the demodulated digital signal. In a wireless-unpacketing block (WdP) 332, digital signals are taken out of a wireless packet and rearranged in the correct order and held in an output interface (OIF) 330 until they are output. The output interface 330 is also provided with a function for detecting presence or absence of a packet whose error cannot be corrected.

Though not illustrated in FIG. 3, it is necessary to prepare the baseband modulation and baseband demodulation blocks 306 and 336 and intermediate frequency modulation and intermediate frequency demodulation blocks 308 and 338 to process an analog signal, among the transmission and reception units, for each narrowband channel.

The control section 360 will be described as follows.

The information of the data stored in the input interface 300 is recorded in an input buffer status memory (BSM) 362. A channel control processor (CCP) 368 can recognize a necessary communication demand from the presence or absence of the data stored in the input interface 300 for each transmission condition category by reading data from the input buffer status memory 362. The latest line-quality information is included in the control information transmitted from the communication party through the control channel 208. The line-quality information is extracted from the control information by the output interface 330 and recorded in the line quality memory (CQM) 364. An algorithm for determining the transmission channels and transmission conditions, which will be described later, is stored in a channel setting rule memory (CST) 366. The channel control processor 368 determines transmission conditions based on the communication demand stored in the input buffer status memory 362 and the information on the line quality stored in the line quality memory 364 in accordance with the channel setting rules stored in the channel setting rule memory 366. A block control circuit (BCC) 370 controls the transmission unit in accordance with the determined transmission conditions.

Moreover, the transmission conditions determined by the channel control processor 368 are recorded in a channel setting memory (CSM) 372. Memory cells the number of which is equal to the number of narrowband channels (n+1 in the case of FIG. 2) are provided in the channel setting memory 372 to record the transmission conditions of the narrowband channel corresponding to each memory cell. The channel control processor 368 controls each narrowband channel independently in accordance with the recorded transmission conditions of the narrowband channels. Control contents, that is, the transmission conditions of each transmission channel are transmitted to the input interface 300 in order to send them to the communication party as part of the control information. A frame pointer 374 is used when the TDMA communication method is adopted. The frame pointer (FP) 374 shows the transmission state of a frame whether it is an access frame or a communication frame and shows what number the transmission-time slot is.

Figure 4:
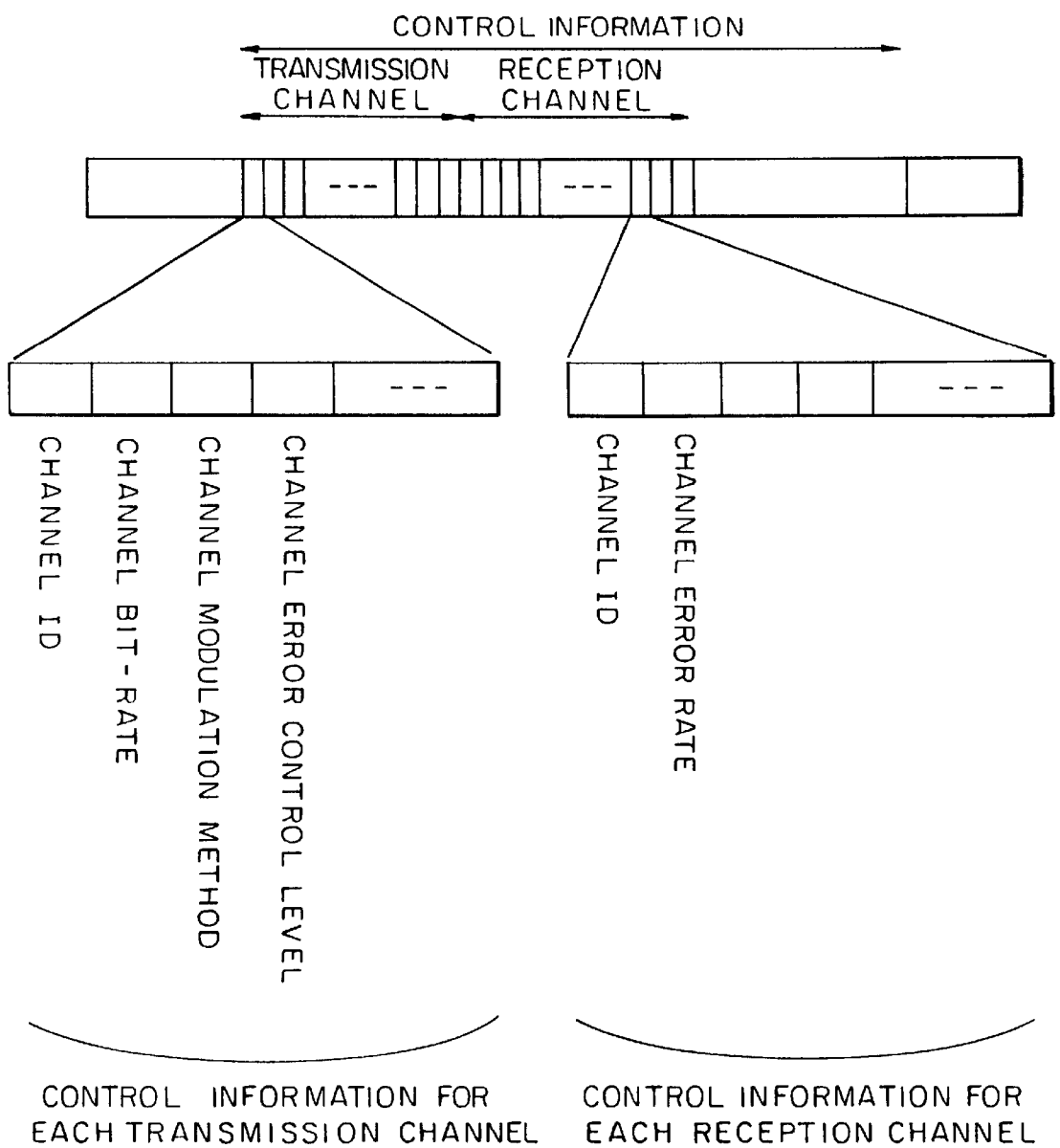
FIG. 4 is a diagram illustrating control information exchanged between transmission and reception radio communication terminals.

FIG. 4 shows an example of control information to be transmitted through a control channel. Control information necessary for the control of transmission and reception circuits are exchanged between radio communication terminals. This is because the transmission conditions and line qualities generally differ and transmission conditions differ from each other even in the same transmission channel depending on the transmission direction. Specifically, the control information for each transmission channel includes the transmission conditions such as the channel bit rate, channel modulation method, and channel error control level to be controlled. Moreover, the control information of each reception channel includes the transmission channel ID and the channel error rate.

Transmission conditions for controlling each narrowband channel will be described below. In the case of the following embodiment, it is premised that an asynchronous transmission mode (ATM) communication system is used and it is assumed that data is input to the input interface 300 as an ATM cell.

(1) Control of error correction code

Error correction codes are controlled for each narrowband channel. When increasing the number of excess bits added for error correction, the number of error bits which can be detected and corrected increases, and the reliability of the line is improved. However, there are disadvantages that a delay occurs in signal processing and the power consumption of the signal processing circuits increases. Therefore, communication is continued by decreasing the number of excess bits to increase a practical transmission rate when the line quality is high and by increasing the number of excess bits when the line quality is low.

A transmission channel is correlated with the transmission condition category, and a transmission-channel error correction code is used as corresponding to each transmission condition category. For example, in the case of voice, a slightly high error rate is allowable but in the case of some data error cannot be tolerated at all. By using a transmission channel to which an error correction method corresponding the quality of service required for the transmission of data, it is possible to improve the flexibility of communication.

By supervising the transmission of data for each transmission condition category and suitably controlling the error correction codes, it is possible to improve the re-usability of a transmission channel. For example, it is assumed that the number of transmission channels assigned to data transmission is insufficient but some of the transmission channels assigned to voice transmission are not used. In this case, it is possible to increase the channel bandwidth for data transmission by switching the error correction codes of some of the transmission channels assigned to voice transmission to error correction codes corresponding to data transmission. Thus, it is possible to improve the communication capacity by controlling the error correction codes in accordance with the line quality and the communication demand.

Figure 5A:
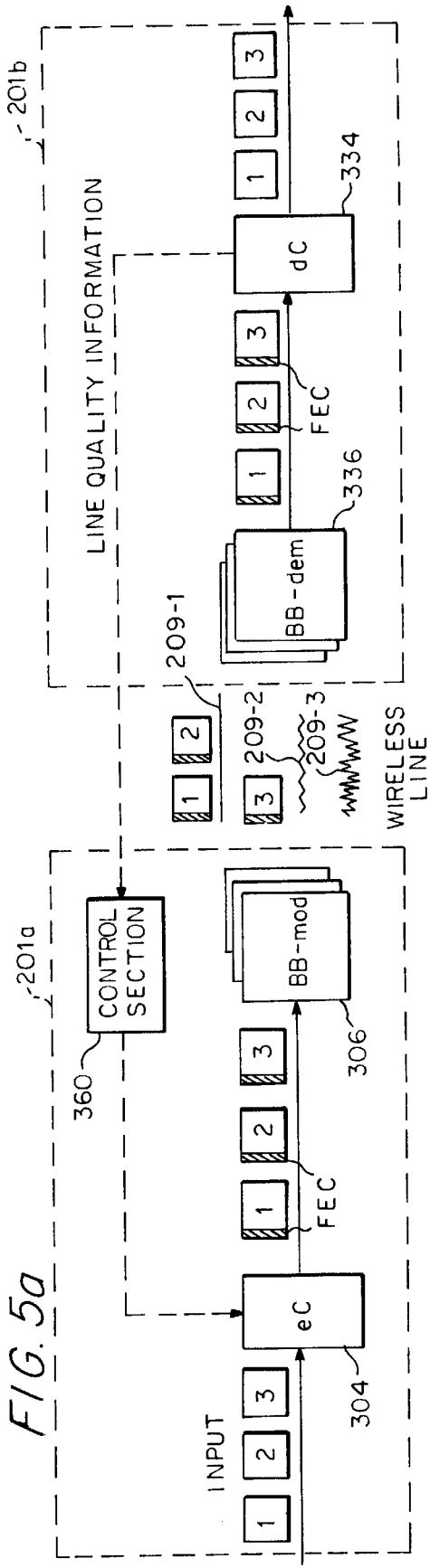
FIGS. 5A and 5B are diagrams for explaining error correction control in the broadband digital radio system.

FIG. 5A is a conceptual drawing of error correction code control of the present invention. A system is assumed which includes three channels such as a transmission channel 209-1 having a high line quality, a transmission channel 209-2 having a slightly lower line quality, and a transmission channel 209-3 having a lowest line quality. The transmission channel 209-3 cannot be used for communication. Packeted data are input to the encoding block 304 (shown in FIG. 3) in which error correction coding different with respect to the transmission channels (209-1 to 209-3) is executed. Because packet 1 and packet 2 pass through the transmission channel 209-1, only moderate error correction coding is applied and thereby, the number of excess bits decreases. Because packet 3 passes through the channel 209-2, strong error correction coding is applied and thereby, the number of excess bits increases.

The above error correction control is performed in accordance with the line quality recognized by a feedback loop. A test signal is transmitted to the transmission channel 209-3 not used for data transmission regularly (e.g. for every frame). The test signal includes a predetermined bit pattern. The error rate is detected depending on whether the bit pattern is correctly received. The reception side ignores the signal of the transmission channel 209-03 except when the test signal is transmitted.

Figure 5B:
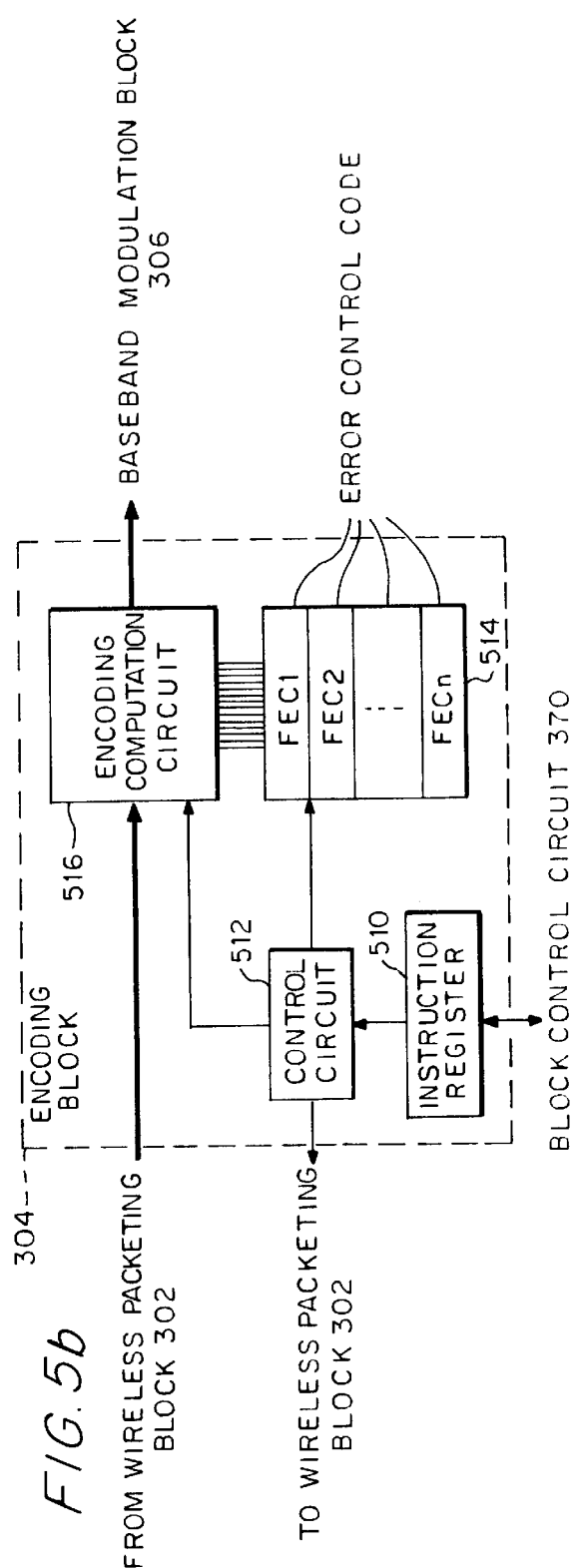

FIG. 5B shows an embodiment of the error correction code control circuit in the encoding block 304. An instruction output from the block control circuit 370 of the control section 360 to designate an error correction code for each transmission channel is temporarily held in an instruction register 510. A control circuit 512 outputs a read signal to the wireless-packeting block 302 in accordance with the instruction of the instruction register 510 and simultaneously outputs the address of an error correction code corresponding to the error correction code designated by the instruction to a code memory 514. Data and an error control code are input to an encoding computation circuit 516 synchronously with a clock signal (not illustrated) and the data are encoded through encoding computation and output to the circuit at the next stage. Thus, by using an error control code, it is possible to change the redundancy of an encoded signal.

(2) Control of wireless packet length

The wireless packet length is controlled for each narrowband channel. When the line quality is extremely deteriorated, a case in which error correction cannot be performed occurs because of too many error bits even if error correction is performed. In this case, the communication quality or transmission efficiency is greatly lowered due to errors as the wireless packet length increases. When a wireless packet containing errors is not retransmitted, the communication quality remarkably deteriorates as the wireless packet length increases. Moreover, in the case of retransmission, the transmission delay is increased as the wireless packet length increases and resultingly, the average transmission rate decreases. However, when the wireless packet length is small even in the transmission channel having a high line quality, the proportion of the header occupying a wireless packet increases and the efficiency lowers. Therefore, to improve the communication efficiency, it is preferable to perform control so as to increase the actual transmission rate by increasing the packet length when the line quality is high but minimize adverse effects due to errors by decreasing the packet length when the line quality is low.

FIGS. 6A and 6B are conceptual drawings of wireless-packet-length control of the present invention. At time 1, there are three transmission channels: the transmission channel 209-1 having a high line quality, the transmission channel 209-2 having a slightly lower line quality, and the transmission channel 209-3 having a lowest line quality FIG. 6A. Data of a certain length corresponding to an ATM cell is read out of the input interface 300 and packeted in wireless packets having lengths different from each other correspondingly to the transmission channel scheduled by the wireless-packeting block 302. The transmission channel 209-1 transmits data in a packet of a large packet length and the transmission channel 209-2 transmits data in a packet of a small packet length. The packets 2 and 3 are packeted in the same wireless packet but the packet 1 is not packeted together with the other packets.

At time 2, the line quality of the transmission channel 209-1 is lowered. Therefore, the packet length is decreased. When packet lengths are changed, the numbers of excess bits for error correction are changed. Therefore, it is necessary to control wireless-packet lengths and error correction codes at the same time. Thus, the wireless-packeting block 302 and the encoding block 304 are simultaneously controlled on the transmission side and the wireless unpacketing block 332 and the decoding block 334 are simultaneously controlled on the reception side.

FIG. 7 shows an embodiment of the circuit of the wireless packeting block 302. A header information memory 714 stores the header information for each transmission channel. The header information includes the address of the transmission-side terminal and category of the transmission. The category is used to judge whether or not it is necessary to request retransmission of the received wireless packet when any data error is present in the wireless packet.

An instruction output from the block control circuit 370 of the control section 360 to designate the wireless packet length to each transmission channel is temporarily held in an instruction register 710. A control circuit 712 outputs an instruction of data transmission to the input interface 300, the memory address of the header to the header information memory 714, and a selection signal to a multiplexer 716 in accordance with the instruction of the control instruction register 710. Header information is first output to and then, data is output to the next-stage circuit in accordance with the control by the control circuit 712 synchronously with a clock signal and thereby, a wireless packet is formed.

In the case of the example of FIG. 6A, for example, the header information h1 corresponding to the transmission channel 209-1 is taken out, then the packets 2 and 3 are input to the multiplexer 716 in order from the input interface 300, and a wireless packet (2–3) is formed.

(3) Control of aerial path

In general, a base station is frequently installed in a position where remote stations can be easily seen and disconnection does not easily occur. In the case of an indoor radio system, an aerial line may be brought under a disconnected state for several seconds to several minutes due to movement of a person or utensil (other than disconnection for a long time in which an antenna or terminal is moved). FIG. 7 is an embodiment for controlling the aerial path. The remote stations 201a and 201b can communicate with each other and moreover, can communicate with the base station. Even when the line quality between the remote stations is extremely lowered and thereby, the required quality of service cannot be satisfied, stable communication can be performed by passing through the base station.

At the time 1, there are three transmission channels: the channel 209-1 having a high line quality, the channel 209-2 having a slightly lower line quality, and the channel 209-3 having a lowest line quality. In the case of this embodiment, it is necessary that not only the transmission channel between the remote stations but also transmission channels 800 and 810 are also supervised. In FIG. 8, for the transmission channels 800 and 810, only one narrowband channel is shown for simplicity.

Because the path (800–810) via the base station includes two stages: the path between a remote station 201a and a base station 830 and the path between the base station 830 and a remote station 201b, the path quality is determined by the line quality 800 or 810 having the lower quality. At time 2 there is shown a case in which the line quality of the transmission channel 209-1 is extremely lowered and data sent by the transmission channel 209-1 is transmitted via the base station. When a plurality of transmission channels are deteriorated, it is possible to transmit data via the base station by using transmission channels between remote stations and the base station the number of which corresponds to that of the transmission channels.

It is possible to select an aerial line in accordance with the same procedure as in the case of giving access to a transmission channel. That is, in an access frame, the remote station of the transmission-side terminal requests the base station to assign a transmission data slot for transmitting data. The remote station performs communication by using the assigned transmission data slot.

A communication system capable of changing a path can be realized by the wireless-packeting block circuit of FIG. 7. When passing through the base station, it is necessary to attach the relay station address (base station) and the actual address (reception-side terminal) to the header of a wireless packet. One of the methods is a method of preparing a wireless packet doubly. The actual address is written in the header of the inside packet and the relay station address is written in the address of the outside packet. It is necessary to prepare a wireless packet including the relay station address as header information by means of a wireless packeting block again by using a wireless packet prepared by including the actual address as header information as data.

As another method, one bit is prepared in the address code in the header information as a relay bit in order to indicate relay transmission. For example, when a relay bit is 1, the base station recognizes the received wireless packet as a packet to be relayed and performs relayed processing.

The base station is generally assumed as a terminal for performing relay. However, it is also possible to perform relay by using a terminal other than the base station as a relay station and designating address of the terminal as a relay address.

The control of transmission conditions of a broadband radio communication system of the present invention have been described above, taking the embodiments as examples. The function for decreasing the load required for the above control or increasing the flexibility of the system will be described below.

Figures 9A, 9B:
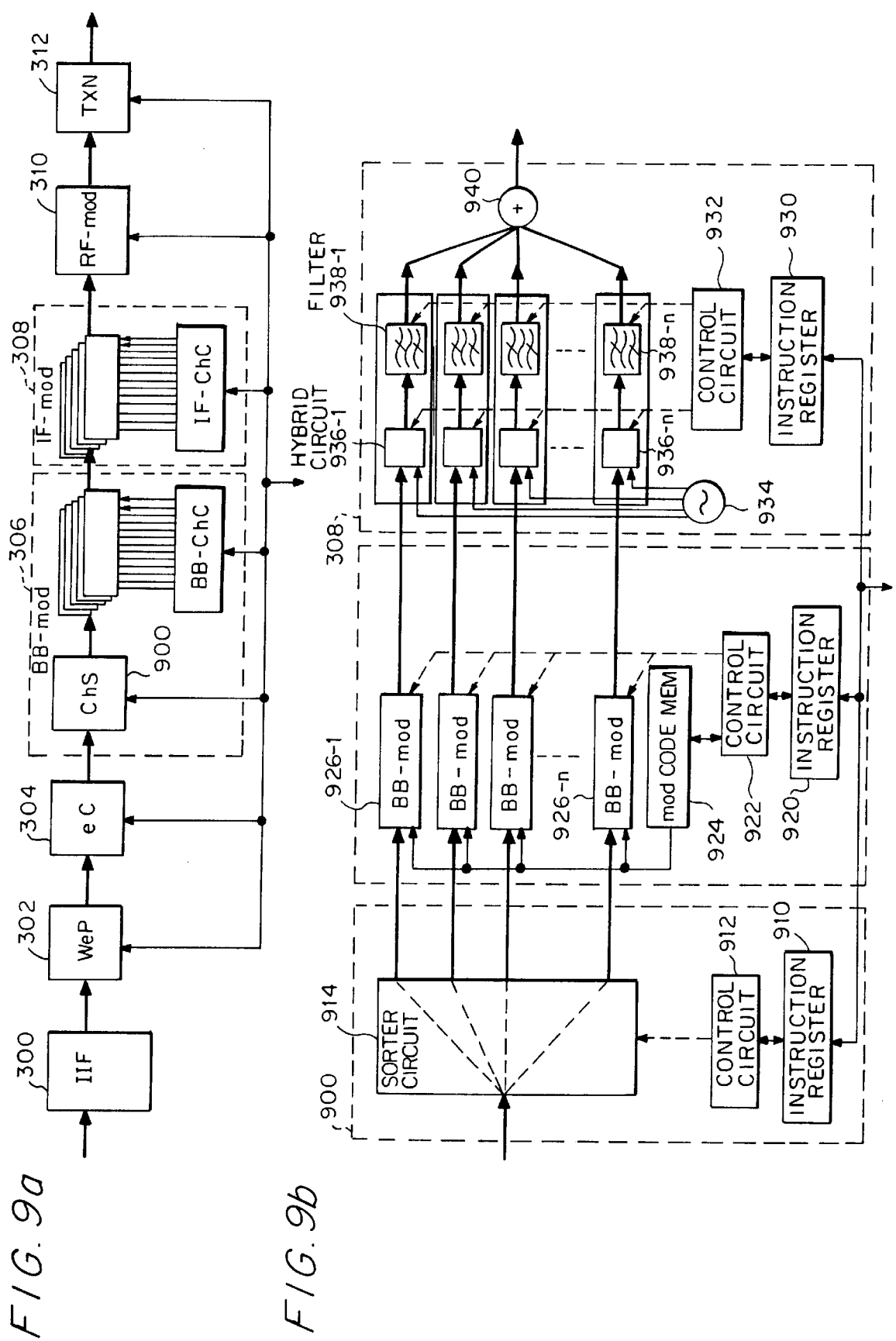
FIGS. 9A and 9B are block diagrams of a frequency multiplexor circuit of a transmission unit of the radio communication terminal.

As described above, it is necessary to simultaneously execute the operations of the baseband modulation block 306 for executing analog-signal processing and the intermediate frequency modulation block 308 which are provided correspondingly to a narrowband channel. FIG. 9A schematically shows the transmission unit of FIG. 3, where the analog modulation section is shown in more detail. The baseband modulation block 306 is provided with a sorter (ChS) 900, namely a series/parallel converter circuit, in order to transmit the data corresponding to each transmission channel in parallel. Wireless packets are arranged for each transmission channel by the sorter 900. Each transmission channel is synchronously input to a baseband demodulator corresponding to each transmission channel from the sorter 900 and thereby, converted into an analog signal in parallel and modulated to a high frequency.

FIG. 9B is a block diagram of a circuit for executing modulation. In the sorter 900, a control circuit 912 controls a sorter circuit 914 and performs classification of wireless packets and the conversion from series to parallel in accordance with an instruction output from the block control circuit 370 of the control section 360 and stored in a channel control register 910. The output of the sorter circuit 914 is input to baseband modulation (BB-mod) circuits 926-1 to 926-n and converted into an analog signal by using a modulation code read out of a modulation code memory (mod code mem) 924 and thereby executing digital-analog conversion.

Then, the analog signal is converted into a signal in an intermediate frequency band by the intermediate frequency modulation circuit block 308. The analog signal output from the baseband modulation circuit is modulated to an intermediate frequency in a narrow intermediate frequency band by a series circuit of a hybrid circuit 936 and a band-pass filter 938 in accordance with a local oscillation signal output by a multiple-frequency local oscillator 934. The outputs of the series circuits are combined by a power combiner circuit 940 and output to the radio frequency modulation block 310.

Figures 10A, 10B:
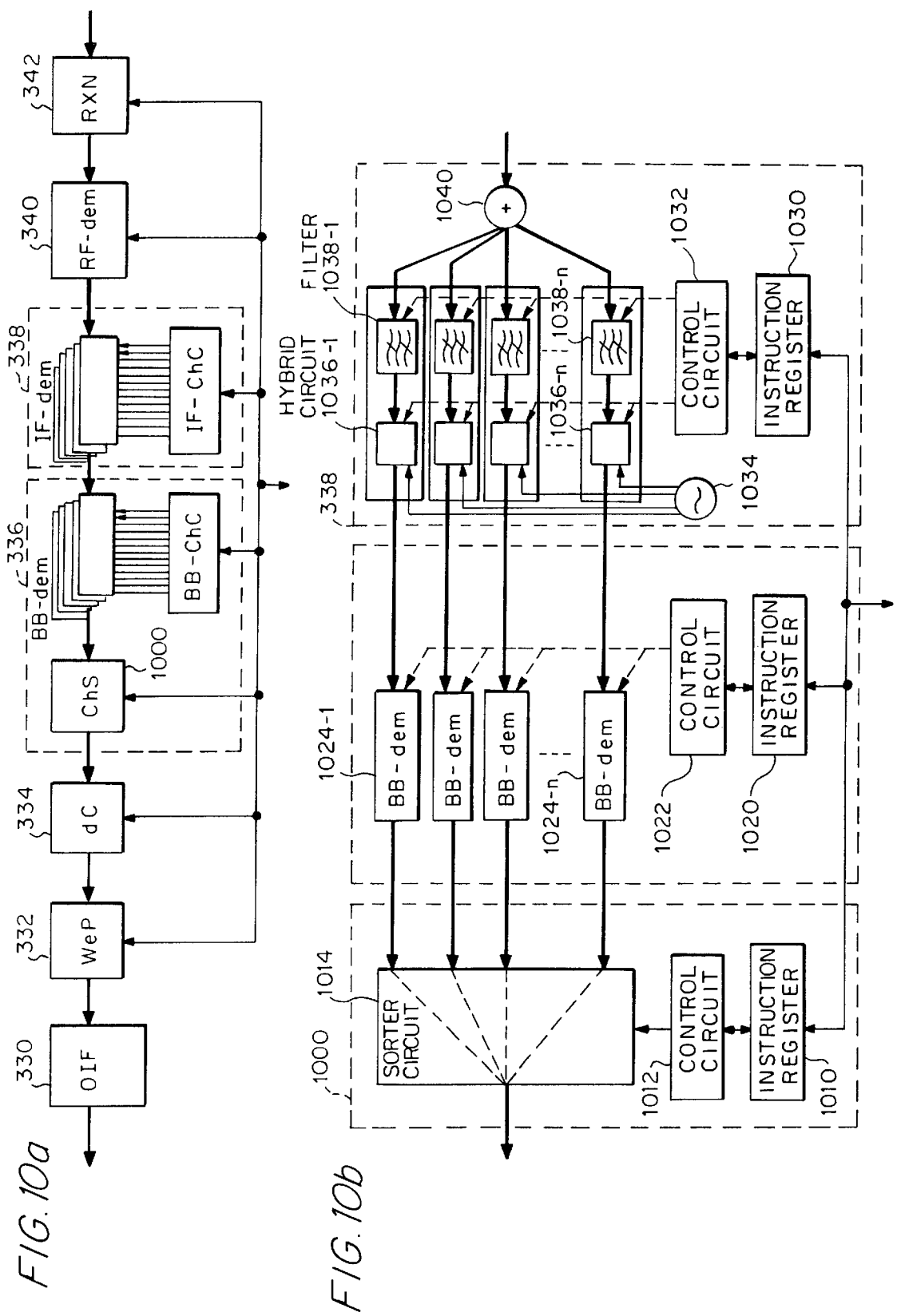
FIGS. 10A and 10B are block diagrams of a frequency demultiplexor circuit of a reception unit of the radio communication terminal.

The reception unit power-distributes combined intermediate frequency signals, separates them into a plurality of signals in an intermediate frequency band, and demodulates the signals to obtain baseband signals. FIG. 10A schematically shows the reception unit of FIG. 3, the analog modulation section being detailed. The baseband demodulation block 336 is provided with a sorter (ChS) 1000, namely, a parallel/series converter circuit, 1000 in order to convert signals obtained by demodulating the data corresponding to each transmission channel in parallel into series.

FIG. 10B is a block diagram of a circuit for executing demodulation. Signals converted into signals in an intermediate frequency band by the radio frequency demodulation block 340 are distributed to series circuits including a plurality of band-pass filters 1038 and a plurality of hybrid circuits 1036 by a power divider circuit 1040. The intermediate frequency components in a narrow intermediate frequency band are separated by the band-pass filters 1038 and demodulated by the hybrid circuits 1036 to low-frequency analog signals with a local oscillation signal output by the multiple-frequency local oscillator 1034. In the baseband modulation block 336, the analog signals are converted from analog to digital values by baseband demodulation (BB-dem) circuits 1024-1 to 1024-n and demodulated to baseband signals. Digital signals output from the baseband modulation circuits in parallel are converted into series by the sorter circuit 1014 and input to the decoding block 334.

In the case of the circuit structures of FIGS. 9B and 10B, the power consumption of a transceiver is saved by bringing a corresponding idle circuit in a narrow frequency band to an out-of-operation state when the communication demand is small. For example, in a communication environment in which an interactive operation is frequently performed like the case of an office personal computer, the instantaneous maximum communication traffic is high but the average communication traffic is low. Because processing circuits in a narrow frequency band are independently provided, it is possible to control the average power consumption of communication terminals by automatically turning off the power supply of a circuit not in operation or lower the voltage so as to conserve power.

Because a broadband communication system uses a wide frequency band, it is suitable for the communication of video or the like requiring high-speed communication. However, by using the above frequency band exclusively for the broadband communication system, the utilization efficiency of frequency resultingly lowers in a utilization environment in which voice and data are frequently transmitted. Particularly, it is desirable that a terminal is inexpensive, and it is considered that many low-quality multimedia terminals coexist. Therefore, by using the same frequency band for communication systems having different bandwidths in common, there is an advantage that the frequency utilization efficiency is improved and communication is realized between communication systems having different bandwidths.

Figure 11A:
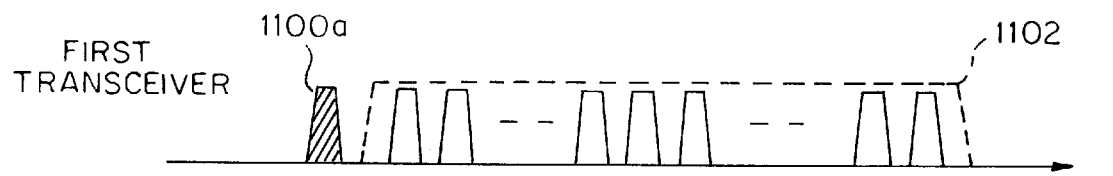
FIGS. 11A–11C are frequency spectrum diagrams which can be transmitted and received by each transceiver in the broadband digital radio system.
Figure 11B:
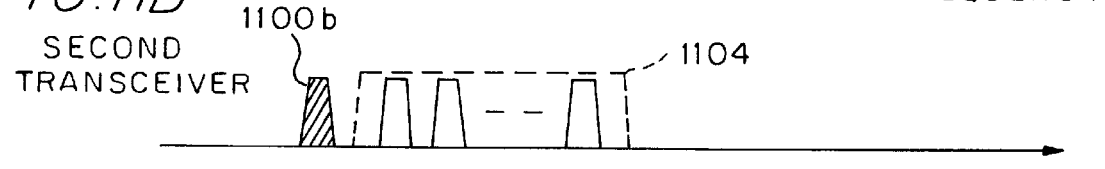
Figure 11C:
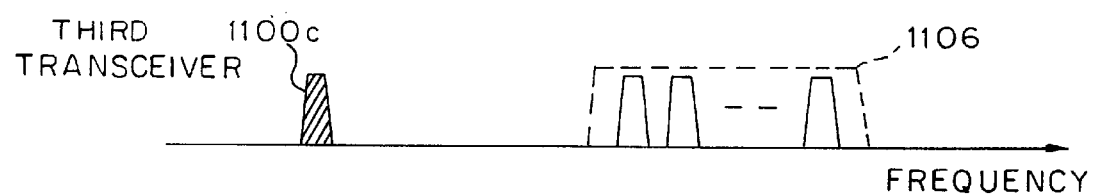
Figure 12:
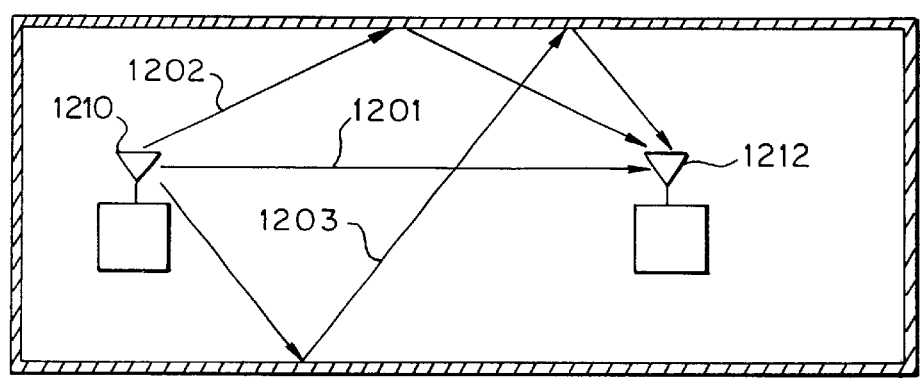
FIG. 12 is a diagram illustrating a multipath phenomenon in indoor radio wave transmission.

FIGS. 11A–11C are diagrams illustrating radio communication between the parties using different frequency bandwidths depending on a broadband radio system. Each transceiver has a control channel 1100 in a common frequency band. Moreover, the base station performs communication by using a frequency band 1102, a second transceiver (remote station 1) performs communication by using a frequency band 1104, and a third transceiver (remote station 2) performs communication by using a frequency band 1106. These frequency bands 1102 to 1106 include a common narrowband channel (transmission channel).

Therefore, by using the common transmission channel, the base station can communicate with the remote stations 1 and 2 respectively. Moreover, the remote station 1 can communicate with the remote station 2 via the base station.

The procedure for setting up an aerial path will be described below. First, to examine the narrowband channel used by transceivers in common, the transceivers to perform communication with each other transmit a narrowband channel which can be used by a transceiver to the party or to the base station controlling the use of the transmission channel through the control channel in an access frame. The channel which can be used for communication is determined in accordance with the above information. Communication is performed through a narrowband channel if one exists that can be used by the transceivers in common. However, communication is performed via the base station when a narrowband channel that can be used by the transceivers in common is not present.

The embodiments described above use a control channel which is a narrowband channel in order to send control information, similarly to the data transmission. Therefore, there is a problem that the control channel is influenced by the environmental change like other radio channels, and therefore, the line quality is unstable. Therefore, it is necessary to control transmission conditions including the transmission rate, modulation method, error control method, packet length, frequency band, and transmission path so that the control channel is not disconnected and the error rate of the control channel is kept lower than those of general transmission channels.

Moreover, though the TDMA method has been described above as a multiple access connection method, it is possible to use a code-division multiple access method by frequency hopping for each narrowband frequency. In this case, however, it is necessary to use a logic circuit for controlling the frequency using sequence.

By dividing one broadband channel into a plurality of narrowband channels and independently setting each transmission condition, it is possible to solve the problem of instability of communication quality in an indoor wireless line and realize a communication system which is flexible so as to accommodate various purposes and communication demands. Further, the communication system is adaptable to communication terminals which use only part of broadband frequencies. Furthermore, by controlling electric power supplied to a circuit portion which may be unnecessary for the requested transmission-rate demand, it is possible to save power, suppress the generation of heat, and reduce the size of the apparatus.

In a system with division of a frequency band, analog signal processing circuits the number of which is equal to the number of narrow frequency bands are necessary. However, because the bit rate of each circuit is low and the circuit scale is small, optimization can be more easily accomplished. Therefore, there is an advantage that the cost of each circuit can be decreased compared to that of a circuit using a high frequency required in a system using a wide frequency band as a single channel and the power consumption can be decreased for each narrowband channel.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. A communication method for setting a transmission condition in a broadband radio communication system which conducts communication between first and second radio communication terminals on a plurality of narrowband channels obtained by dividing a broadband channel, said communication method comprising the steps of:

setting a transmission condition of at least Dart of said narrowband channels in the first radio communication terminal;

transmitting a wireless communication from the first radio communication terminal to the second radio communication terminal on the at least part of the narrowband channels for which the transmission condition has been set;

measuring in said second radio communication terminal a line guality of each narrowband channel of the at least part of the narrowband channels upon receipt of said wireless communication from said first radio communication terminal;

transmitting line quality information indicating the line quality of each narrowband channel of the at least part of the narrowband channels from said second radio communication terminal to said first radio communication terminal; and causing said setting step to be performed using a new transmission condition for each narrowband channel of the at least part of the narrowband channels based on said line quality information received from said second radio communication terminal, wherein said transmitting a wireless communication step comprises the step of:

transmitting a test signal from said first radio communication terminal to said second radio communication terminal on another part of the narrowband channels other than the at least part of the narrowband channels, and wherein said measuring step comprises the step of:

determining an error rate of each narrowband channel of the at least part of the narrowband channels based on an error rate in said test signal received from said first radio communication terminal.

2. A radio communication terminal for use in a broadband radio communication system which conducts communication between a plurality of radio communication terminals on a plurality of narrowband channels obtained by dividing a broadband channel, said radio communication terminal comprising:

a transmitter which transmits a wireless communication on at least a part of the narrowband channels to another radio communication terminal according to a transmission condition which has been set;

a receiver which receives wireless communication on the at least a part of the narrowband channels from said another radio communication terminal according to a set transmission condition;

a detector which detects a line quality of each narrowband channel of the at least part of the narrowband channels upon receipt of said wireless communication by said receiver; and a controller which causes said transmitter to transmit line quality information representative of said line quality of each of said narrowband channels of said at least part of the narrowband channels detected by said detector to said another radio communication terminal, and sets a new transmission condition for each narrowband channel of the at least part of the narrowband channels based on line quality information received by said receiver from said another radio communication terminal, wherein said transmitter transmits a test signal to said another radio communication terminal on another part of the narrowband channels other than the at least part of the narrowband channels, and wherein said detector determines an error rate of each narrowband channel of the at least part of the narrowband channels based on an error rate in said test signal received from said another radio communication terminal.

3. A broadband digital radio communication system which conducts communication on a plurality of narrowband channels obtained by dividing a broadband channel into a plurality of narrowband channels, comprising:

a first radio communication terminal which sets transmission conditions of at least part of the narrowband channels and transmits a wireless packet on the narrowband channels of which the transmission conditions have been set; and a second radio communication terminal which receives the wireless packet from said first radio communication terminal, measures the line qualities of the narrowband channels and transmits measured line quality information to said first radio communication terminal, wherein said first radio communication terminal receives said line quality information. sets new transmission conditions based on said line quality information, and transmits a wireless packet to said second radio communication terminal through the narrowband channels under the new transmission conditions, and wherein, when the first radio communication terminal transmits a wireless packet to said second radio communication terminal through the at least part of the narrowband channels, said first radio communication terminal transmits a test signal through the narrowband channels other than the at least part of the narrowband channels, and said second radio communication terminal measures the line quality of every narrowband channel using information of an error rate of a wireless packet for the at least part of the narrowband channels and an error rate of a test signal for narrowband channels other than the at least part of the narrowband channels and transmits the measured line quality information to said first radio communication terminal.

4. A broadband radio communication terminal for a broadband digital radio system which conducts communication between a plurality of narrowband channels obtained by dividing a broadband channel, said broadband radio communication terminal comprising:

a transmission unit;

a reception unit; and a control unit, wherein said transmission unit comprises:

an input interface for temporarily holding transmission data for each of a plurality of categories, each transmission data being classified to said categories in accordance with a quality of service required to transmit the transmission data in order of arrival, a wireless packeting block for incorporating the transmission data into a wireless packet for wireless transmission, an encoding block for executing coding for the wireless packet for wireless transmission, and error control coding, a baseband modulation block for converting the wireless packet serving as a digital signal into a transmission analog signal and shaping transmission analog waveform, an intermediate frequency modulation block for modulating the transmission analog signal to a transmission intermediate frequency signal and removing frequency components other than the intermediate frequency band corresponding to a predetermined narrowband channel for each narrowband channel, and adding the transmission intermediate frequency signal of each narrowband channel, and a radio frequency modulation block for modulating the added transmission intermediate frequency signal to a transmission radio frequency signal, amplifying the signal power up to a level necessary for transmission, and removing frequency components other than the radio frequency components other than the radio frequency band corresponding to a predetermined narrowband channel;

wherein said reception unit comprises:

a radio frequency demodulation block for demodulating the reception radio frequency signal to a reception intermediate frequency signal, an intermediate frequency demodulation block branching the reception intermediate frequency signal and demodulating to reception analog signals closer to a baseband, corresponding to the narrowband channels, a baseband demodulation block for demodulating the reception analog to a reception digital signal, a decoding block for decoding the reception digital signal when the signal is encoded and executing error correction, a wireless unpacketing block for taking out reception data from the wireless packet of the reception digital signal, and an output interface for rearranging the reception data in the correct order and temporarily holding the reception data; and wherein said control unit comprises:
- a buffer status memory for recording an input amount of transmission data of each category in the input interface,
- a line quality memory for storing the quality of a transmission line,
- a narrowband channel control processor for setting transmission conditions of each narrowband channel in accordance with the input amount of transmission data of each category, the quality of the transmission line, and predetermined rules, and
- a channel setting memory for storing transmission conditions set for each of the narrowband channels.

5. A broadband digital radio communication terminal according to claim 4, wherein the transmission conditions of each of the narrowband channels set by the narrowband channel control processor include error correction control, wireless packet length, and selection of transmission path.

* * * * *